(12) United States Patent
Bouckaert et al.

(10) Patent No.: US 7,519,051 B2
(45) Date of Patent: Apr. 14, 2009

(54) METHODS AND RELATED APPARATUS FOR OPERATING A GATEWAY TO ACT AS A CONDUIT FOR A STRUCTURED TRANSACTION

(75) Inventors: Philippe Bouckaert, Biot (FR); Didier Desiderio, Le Cannet (FR); Pierre Garnero, Grasse (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 11/181,031

(22) Filed: Jul. 12, 2005

(65) Prior Publication Data

US 2006/0034258 A1    Feb. 16, 2006

(30) Foreign Application Priority Data

Aug. 13, 2004  (EP)  ................. 04300539

(51) Int. Cl.
*H04L 12/66* (2006.01)
*H04J 3/12* (2006.01)

(52) U.S. Cl. ...................... 370/352; 370/524
(58) Field of Classification Search ........ None
See application file for complete search history.

(56) References Cited

U.S. PATENT DOCUMENTS

| | | | |
|---|---|---|---|
| 5,428,665 A * | 6/1995 | Lantto ............... | 455/414.1 |
| 6,529,524 B1 * | 3/2003 | Liao et al. ............ | 370/467 |
| 6,823,061 B2 | 11/2004 | Prasad et al. | |
| 6,885,872 B2 | 4/2005 | McCann et al. | |
| 7,043,002 B2 | 5/2006 | Delaney et al. | |

(Continued)

FOREIGN PATENT DOCUMENTS

EP    1 377 082 A1    1/2004

(Continued)

OTHER PUBLICATIONS

Loughney, J., et al., "SS7 SCCP-User Adaptation Layer (SUA) <draft-ietf-sigtran-sua-07.txt>", *IETF*, Jun. 30, 2002, accessed via internet: <http://www.openss7.org/docs/draft-ietf-sigtran-sua-07.txt>, retrieved on Jun. 26 2004.

(Continued)

*Primary Examiner*—Wing F Chan
*Assistant Examiner*—Eunsook Choi

(57) ABSTRACT

A method is described for operating a gateway to act as a conduit for a structured transaction between a first transaction peer and a second transaction peer, the structured transaction having at least a begin message for opening a logical communication path, a continue message for maintaining a logical communication path and an end message for closing a logical communication path. The method comprises the steps of: receiving a first begin message from the first transaction peer; receiving from the first transaction peer a continue message having a request element; determining a routing key identifying the second transaction peer from the continue message; constructing and sending a second begin message, including the component, to the second transaction peer; receiving a first end message including a response element from the second transaction peer; constructing and sending a second end message including the response element to the first transaction peer. In described embodiments, the gateway is a signalling gateway linking an SS7 network and an IP network and the structured transaction is a TCAP structured dialogue.

16 Claims, 2 Drawing Sheets

U.S. PATENT DOCUMENTS

| | | |
|---|---|---|
| 7,103,037 B2 | 9/2006 | Roque et al. |
| 7,209,759 B1 | 4/2007 | Billing et al. |
| 7,283,519 B2 | 10/2007 | Girard |
| 7,353,296 B2 * | 4/2008 | Nuuttila ............... 709/246 |
| 7,363,381 B2 | 4/2008 | Mussman et al. |
| 2003/0041122 A1 | 2/2003 | Segal ............... 709/219 |
| 2003/0072425 A1 * | 4/2003 | Hurst ............... 379/114.01 |
| 2003/0123474 A1 * | 7/2003 | Triano et al. ............... 370/450 |
| 2003/0231643 A1 | 12/2003 | Gilchrist et al. ............... 370/401 |
| 2004/0001517 A1 | 1/2004 | Lamberton et al. ............... 370/522 |
| 2006/0276226 A1 * | 12/2006 | Jiang ............... 455/558 |

FOREIGN PATENT DOCUMENTS

| | | |
|---|---|---|
| WO | 01/82635 A1 | 1/2001 |

OTHER PUBLICATIONS

Sidebottom, G., et al., "RFC 3332 Signaling System 7 (SS7) Message Transfer Part 3 (MTP3)—User Adaptation Layer (m3UA)", *IETF*, Sep. 2002, 2002 (120 pages).

* cited by examiner

METHODS AND RELATED APPARATUS FOR OPERATING A GATEWAY TO ACT AS A CONDUIT FOR A STRUCTURED TRANSACTION

BACKGROUND OF THE INVENTION

1. Field of the Invention

The invention relates to methods, and related apparatus, for controlling processing entities used, for instance, in communication systems such as for the control of signalling traffic between a signalling gateway and a plurality of application server processes.

2. Background Art

Establishing connections between two telephones involves a complex interaction of digital messages, hereinafter referred to generally as signalling. Nowadays telephone systems perform what is known as "out-of-band" signalling. Out-of-band signalling means that the communications required between the switches and other equipment in the network take place on communication channels other than the channel by which the voice or data flows. Typically, the out-of-band signalling takes place by means of digital communication channels. Thus, the public switch telephone network (PSTN) generally uses two types of channels, media and signalling.

Several protocols have been defined for out-of-band signalling. The most commonly used protocol, in North America, Asia and Europe, is known as Signalling System No. 7 (SS7). However, the SS7 protocol defines more than just a protocol for communication between switches. It also defines an entire switching network for facilitating signalling for call establishment, routing, and information exchange functions of switched circuit networks.

Since the amount of data transferred over data networks is now much larger than the voice traffic that is carried over the PSTN, carriers are in the process of consolidating both types of networks. In addition, telecommunication networks are increasingly making use of standard computing hardware in order to reduce IT costs.

Therefore, there is a trend in the telephone industry to migrate telephone systems using SS7-based networks for signalling to Internet Protocol (IP) networks. The Internet protocols are standardised by the Internet Engineering Task Force (IETF). Moving either or both of the media and signalling channels to an IP infrastructure involves the use of very different technologies and can be done independently. One IETF working group, called the Sigtran Group, is defining the protocols for back-hauling SS7 signalling messages across IP networks. Generally speaking, signalling across an IP network involves replacing the lower levels of the SS7 layered protocol communications and transport layers with IP network protocol communications and transport layers.

The IETF in collaboration with the Sigtran group have taken the initiative to define open standards for transporting SS7 over IP networks. With Sigtran technology, telephone services which today lie on top of SS7 networks, can run Application Servers (ASs) lying on top of IP networks. The interworking with SS7 networks is performed by Sigtran signalling gateways (SGs).

To enhance the availability of the signalling gateway, it can be distributed over several processes running in one or several computers, each of them being a Signalling Gateway Process (SGP). Every SGP belonging to a particular SG has the same SS7 point code (or the same list of PCs), with each SGP being connected to the SS7 network through redundant links.

On the IP side, each SGP is connected to Application Servers running the services. Each Application Server, which can typically be identified with a single logical service, such as a Short Message Service Centre (SMSC), can be implemented in a distributed manner by one or more processes or computers—referred to as the Application Server Processes (ASPs). To provide improved reliability, each SGP is typically directly connected to each ASP through an SCTP association such that there is one association between each SGP and each ASP.

A function performed by the signalling gateway is to receive SS7 signalling messages and direct them to the appropriate AS. To do so, the SG identifies a routing key (RK) defined by the M3UA or SUA protocol, which uniquely identifies the AS in accordance with parameters in the SS7 message. In general, the RK parameters are found in the header of the SS7 message. However, it may be desirable to take into account other elements of the message, such as a SMS originating number or some other aspect of the message content, in order to direct the message to the appropriate AS.

However, this variety of possibilities for the routing key definition can lead to problems in that in some circumstances the signalling information field of a single TCAP message may be too small to carry all the elements that might define a routing key.

This invention is directed to enabling a signalling gateway to act as a conduit for a transaction in which routing key information are not transmitted to the gateway at the beginning of a transaction message exchange and without requiring either the signalling gateway or any application server to have to manage a context for the transaction.

SUMMARY OF THE INVENTION

In brief, this achieved by a method of operating a gateway to act as a conduit for a structured transaction between a first transaction peer and a second transaction peer, the structured transaction having at least a begin message for opening a logical communication path, a continue message for maintaining a logical communication path and an end message for closing a logical communication path, the method comprising the steps of: receiving a first begin message from the first transaction peer; receiving from the first transaction peer a continue message having a request element; determining a routing key identifying the second transaction peer from the continue message; constructing and sending a second begin message, including the component, to the second transaction peer; receiving a first end message including a response element from the second transaction peer; constructing and sending a second end message including the response element to the first transaction peer.

The first begin message can include a context name and the method can comprise responding to the first begin message with a return continue message that includes a parameter identifying a context name, and wherein the step of constructing the second begin message comprises extracting the parameter from the continue message; determining the context name using the parameter; and including the retrieved context name in the second begin message.

The step of constructing the second begin message can include inserting a point code associated with the gateway in a calling party field and the step of constructing the second end message can include removing the application context and the point code from a called party field.

In preferred embodiments, the gateway is a signalling gateway linking an SS7 network and an IP network and the structured transaction is a TCAP structured dialogue although it will be understood that application of the technique to similar or comparable environments is not excluded. The second transaction peer could be an application server, for instance, and the first transaction peer a MAP user.

In another aspect of the invention, apparatus is provided for interconnecting at least a first signalling network with an application server via a second network, the apparatus being arranged to act as a conduit for a structured transaction between a first transaction peer on the first signalling network and a second transaction peer comprised in the application server, the structured transaction having at least a begin message for opening a logical communication path, a continue message for maintaining a logical communication path and an end message for closing a logical communication path, the apparatus being arranged to: receive a first begin message from the first transaction peer; receive from the first transaction peer a continue message having a request element; determine a routing key identifying the second transaction peer from the continue message; construct and send a second begin message, including the component, to the second transaction peer; receive a first end message including a response element from the second transaction peer; construct and send a second end message including the response element to the first transaction peer. The apparatus can be a signalling gateway.

A further aspect of the invention provides a method for operating a switched circuit telephone network using the above described method.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
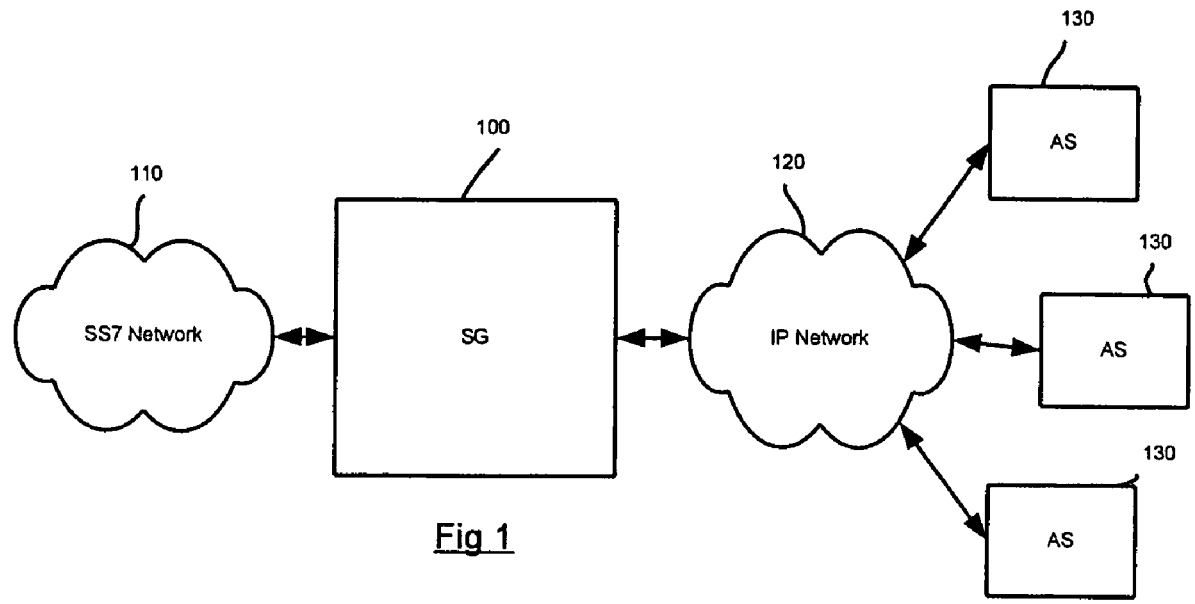
FIG. 1 shows the general configuration of a signalling gateway.
Figure 2:
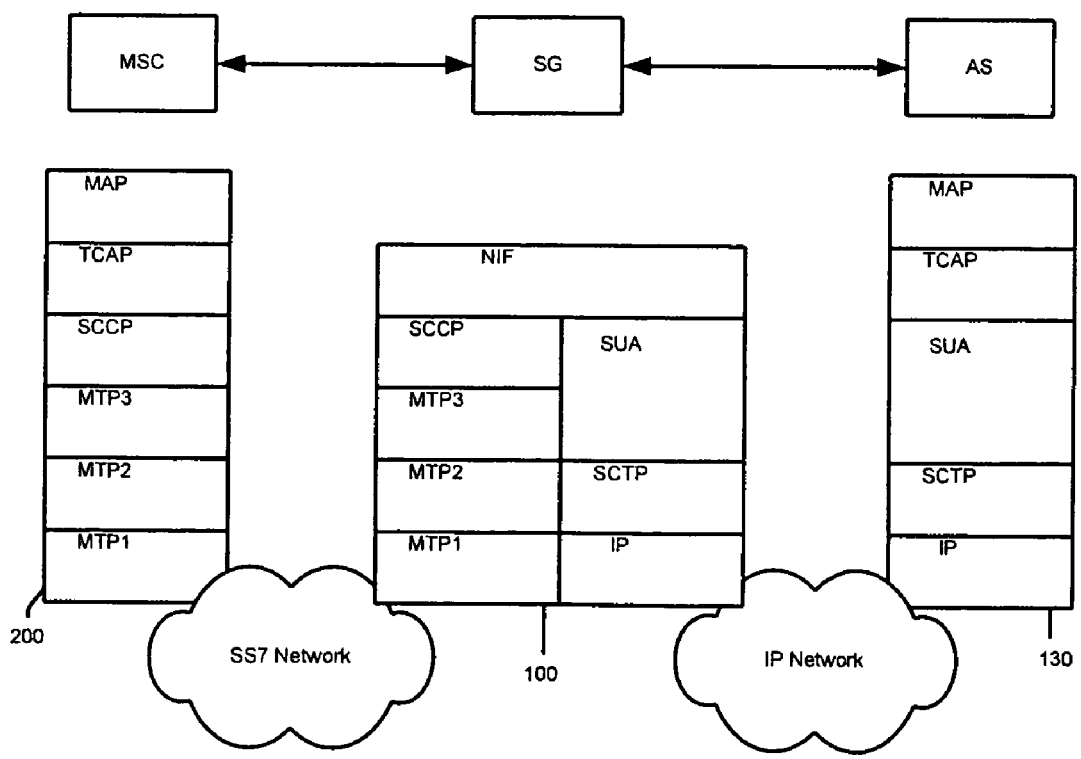
FIG. 2 illustrates the layered protocol communications schemes of a Signalling End Point, a Signalling Gateway Process and an Application Server Process.

FIG. 1 shows the general configuration of a signalling gateway 100 interconnecting an SS7 network 110 and a series of Application Servers (ASs) 130 via an IP Network 120. FIG. 2 illustrates the layered software architecture of the various components. In the example shown, a Mobile Switching Center (MSC) 200 includes the MTP1, MTP2, MTP3, SCCP and SCCP user part (in the example shown, TCAP and MAP) layers. As is well known, the MAP (Mobile Application Part) is a standard protocol that lies above TCAP and that is used between mobile switches and databases to support user authentication, equipment identification, and roaming. The MTP layers comprise three levels. Levels 1 and 2 are used for the transfer of SS7 messages from one point to another over an individual signalling link. Level 3 is used for the transfer of SS7 messages over the SS7 network beyond the requirements of individual link transmission. The MTP3 layer is mainly dedicated to ensuring the delivery of incoming and outgoing messages (such as discrimination, distribution and routing), and the network reconfiguration (such as traffic management, route management and link management).

Communication between Signalling Gateway Processes (SGPs) of the SG 100 and Application Server Processes (ASPs) within the ASs 130 is carried out using a transport layer defined by the Sigtran working group and referred to as SCTP (Stream Control Transfer Protocol). Signalling Gateway 100 terminates the MTP1, MTP2, MTP3 and SCCP layers and includes a Nodal Interworking function (NIF) as well as SUA and SCTP and IP layers. Each AS 130 includes IP, SCTP, SUA and SCCP user layers (TCAP and MAP). Signalling Gateway 100 thus terminates the SS7 lower layers and encapsulates their payload data into SCTP messages to send them to an Application Server 130. The AS terminates the SCTP layers, processes the signalling messages and replies to the SG 100 in the same way.

This architecture is well known to those skilled in the relevant art and is described in the SUA specification defined by the IETF, for instance.

One feature of the TCAP protocol is that TCAP exchanges support the notion of a structured dialogue. The structured dialogue facilities provide the capability for TCAP users to act as transaction peers, to explicitly initiate a dialogue, exchange components within the dialogue, terminate it, or abort it. In order to better understand the present invention, the following is a brief summary of the relevant aspects of the operation of a TCP structured dialogue.

The TCAP dialogue handling service interface enables the TCAP-user (such as a MAP layer within MSC 200), to make use of additional services provided by the transfer and negotiation of application context and the transparent transfer of other user information.

In a structured dialogue, a first TCAP-user, acting as a first transaction peer, begins a new dialogue by sending a TC-BEGIN request primitive to a second TCAP-user, acting as a second transaction peer. The purpose of this primitive is to indicate to the TCAP Component Sub-layer that a new dialogue has started, identified by the "dialogue ID" parameter of the primitive and to request transmission of any component (s) previously passed to the TCAP Component Sub-layer by means of component handling primitives of the "request" type with the same dialogue ID.

A TCAP-user that begins a new dialogue may also indicate, as an option, the application context name applicable to it. The application context name is used to enables the TCAP users to inform each other of their capabilities (ie what versions and protocol types it supports).

If the Application Context Name parameter has been included in the TC-BEGIN request primitive, a Dialogue Request (AARQ) APDU is also sent by the first TCAP user, concatenated with the Component Portion.

The second TCAP-user indicates that it wants to continue a dialogue by issuing a TC-CONTINUE request primitive. This establishes the dialogue proposed in the received TC-BEGIN indication primitive.

If the second TCAP-user receives an Application Context Name parameter in the TC-BEGIN indication primitive, and this Application Context is supported, the TC-user should include the same value in the first backward TC-CONTINUE request primitive. This is achieved by sending a Dialogue Response (AARE) APDU concatenated with any components in a TC-CONTINUE message. If the proposed Application Context Name is not supported, the second TCAP-user may still wish to continue the dialogue but offer a different Application Context Name in the first backward TC-CONTINUE request primitive. This is achieved by sending a Dialogue Response (AARE) APDU to be concatenated with any components in a Continue message. In both these cases, the "result" field of the AARE APDU is set to "accepted" while the "result-source-diagnostic" field is set to either "dialogue-service-user (null)" or "dialogue-service-user (no reason given)". The choice of one or the other value is implementation-dependent and they are semantically equivalent as far as the TCAP recommendation is concerned.

At this stage the second TCAP-user may optionally include an originating address parameter. This optional parameter only applies to the first backward continue (i.e. the establishment of the dialogue). Once a dialogue is established the addresses do not change.

The dialog is terminated by the second TCAP user sending a TC-END message to the first TCAP user.

Returning to the operation of SG 100, the AS for each particular message received at the SG 100 via SS7 network 110 is determined by a Routing Key. The Routing Key describes a set of SS7 parameters and/or parameter-ranges that uniquely defines the range of signalling traffic configured to be handled by a particular Application Server. An example would be where a Routing Key consists of a particular SS7 SCCP SSN plus an identifier to uniquely mark the network that the SSN belongs to, for which all traffic would be directed to a particular Application Server. Possible SS7 address/routing information that comprise a Routing Key entry may include, for example, OPC, DPC, SIO found in the MTP3 routing label, SCCP subsystem number, or Transaction ID. Routing Keys are mutually exclusive in the sense that a received SS7 signalling message cannot be directed to more than one Routing Key. In addition to the routing keys defined by the IETF, some SUA gateways allow routing keys to be defined based on MAP parameters, for instance to select an AS by application type.

For example, the MO-SMS Operation forwardSM contains the originating address, SM RP OA, which may be used as a routing key to identify a specific AS. This operation, like the majority of MAP services, uses a short TCAP structured dialogue: the MAP operation can be sent within the BEGIN message, and the response from the AS can be sent within the END message. Thus in this case, the SG may be able to select the AS using the MAP information and send it the BEGIN message. Negotiation of the Application Context Name may occur when opening the dialogue, i.e. it may be sent within the BEGIN message and in the first CONTINUE or END that is sent back as described above.

However, for various reasons, the MAP operation is not in all cases sent within the BEGIN message, but is sometimes sent within a CONTINUE message that is sent after the dialogue has been acknowledged. This might occur, for instance, when the data is too large to be sent in the BEGIN message because of a large Application Context Name length. It will be understood that the signalling information field of a TCAP message consists of an integral number of octets, greater than or equal to 2 and less than or equal to 272 on the legacy ss7 network. This limitation does not exist on SIGTRAN network.

In these cases, when the SG receives the BEGIN message, it does not have enough information to determine the routing key and therefore to forward the message to the correct AS immediately.

It is possible to deal with this at the AS level by configuring the SG with a default routing key that is used where the routing key cannot be determined. The BEGIN message and subsequent CONTINUE message, that would normally include the MAP operation that determines the routing key, will then be sent to the AS defined by this default routing key. This default AS can then be arranged to determine the correct routing key and to open a new dialog with the AS for which the MAP operation is intended. The default AS would then need to coordinate the two dialogues.

This approach, whilst no doubt satisfactory in some circumstances, may result in performance disadvantages since a new dialogue must be initiated, and all the messages must be routed through a default AS which in addition has to maintain a context for the ongoing dialogues. Further, all the AS's must support IP Signalling Point communications in order to intercommunicate.

The present embodiment employs a different approach which allows the SUA layer to select an AS from information contained within the MAP operation sent in a CONTINUE message, without using a default AS, and without creating a context on the SG.

In the present embodiment, the NIF of SG 100 is arranged to take part in the dialogue by in particular carrying out the application context negotiation instead of the destination AS. In order to make this possible, the SG configuration is provided with a list of application contexts supported by all AS's which may be reached through the SG. It is assumed that all the Application Servers managed by the SG all support the same versions, and the same application-contexts.

Figure 3:
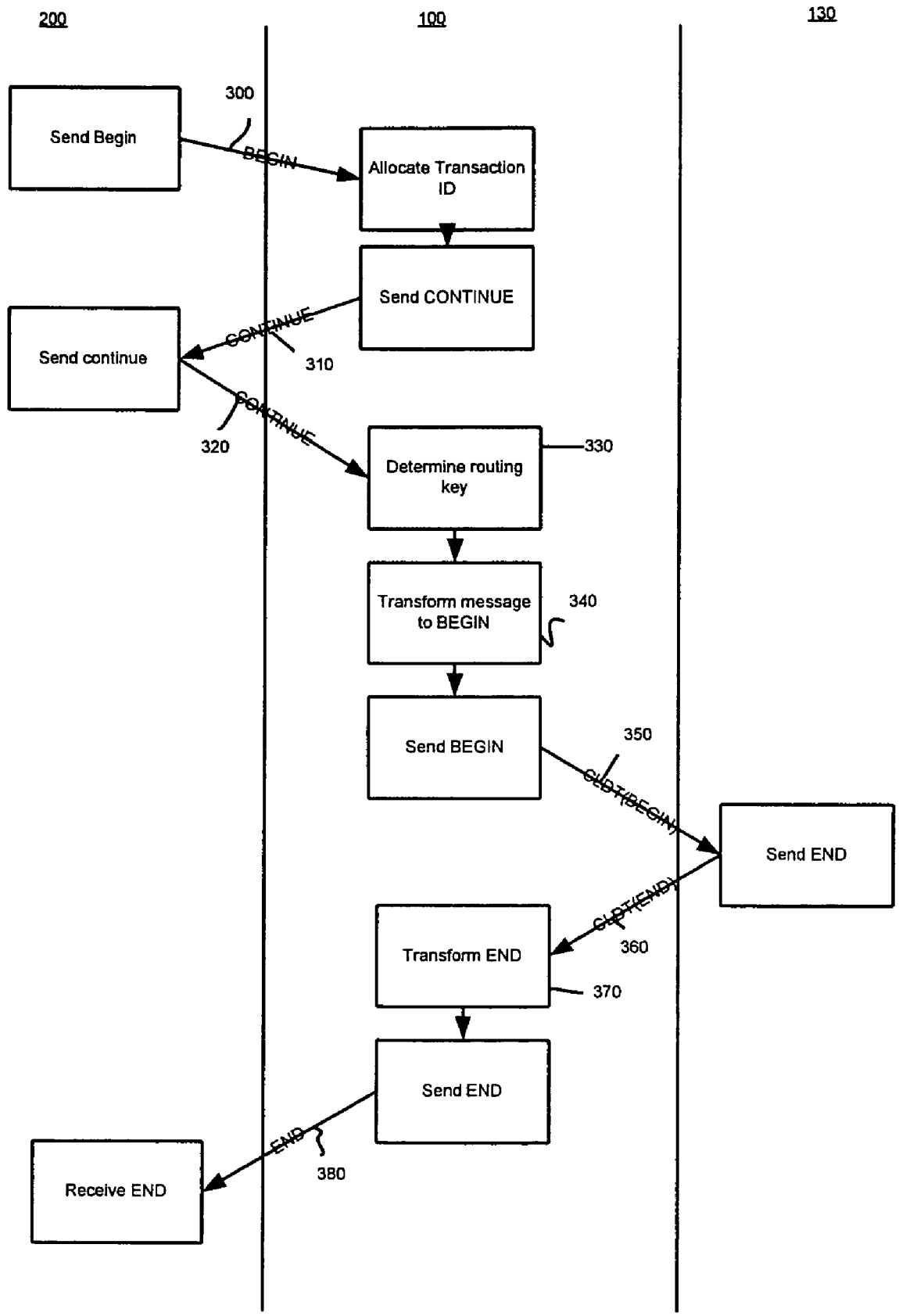
FIG. 3 is a flow diagram illustrating a TCAP transaction carried out via a signalling gateway.

The process employed is illustrated in FIG. 3 and is as follows, in an example where a first transaction peer is a MAP layer in an MSC 200 and a second transaction peer is a MAP layer in an AS 130:

1. The SG 100 receives a TC-BEGIN from, for instance, an MSC 200—step 300.
2. According to the version, and application context supported by the AS's 130, SG 100 accepts or renegotiates the dialogue, by sending back a TC-CONTINUE, with an AARE if the TC-BEGIN had an AARQ—step 310.

When answering the BEGIN to MSC 200, SG 100 allocates a transaction ID, which is included in the TC-CONTINUE message sent back to MSC 200 as the originating transaction ID. This ID has 4 bytes, one of which is used to identify the Application Context Name sent in this CONTINUE by reference to a context table which is accessible to the SG 100. Since the originating transaction ID is included in subsequent TC-CONTINUE messages sent by MSC 200, the need to create a context to maintain this information on SG 100 is avoided.
3. For this dialogue, the SG 100 then receives from MSC 200 a TC-CONTINUE message which encapsulates the MAP operation to be transmitted to the AS—step 320. The routing key is determined by SG 100 from the MAP parameters in step 330. SG 100 is able to retrieve the Application Context Name for this dialogue by referring to the context table using the destination transaction ID.
4. In step 340, this information is used by SG 100 to build a BEGIN message that includes the MAP operation. A CLDT (Connectionless Data Transfer) message is sent to the AS in step 350, but containing a TC-BEGIN message, with the same information as the TC-CONTINUE message received (Called/Calling Party Address, Originating Transaction ID). The AARQ-PDU (A-Associate Request) is built inside the TC-BEGIN message. This TC-BEGIN message will contain the MSC Originating Transaction ID. Thus the AS 130 will be able to answer is if it were answering directly to the MSC 200.

SG 100 is arranged to put its own PC in the called party address field when generating the BEGIN message 350 to indicate that it is mediating the transaction, as will be described below.
5. The AS replies with a CLDT contained the TC-END message—step 360. If the application context is not supported for whatever reason, the dialogue will be aborted. Normally, this event should not occur because SG 100 is aware of which application contexts are supported by the AS's 130.

When answering, the AS will normally put an AARE-apdu (A-Associate Response) in the TC-END message. In answering the TC-BEGIN, the AS calls the TCAP MAP_CLOSE primitive. Within this primitive, there is normally no way to change the Called Address received which may contain the PC of the SG 100 as described above. The TCAP layer automatically exchanges the called and calling party address when sending the END message.

6. The CLDT received at SG 100 from AS 130 is translated to SCCP UDT/XUDT messages according the normal SUA rules, but before sending the resulting SCCP message in step 380, SG 100 modifies it by removing the AARE-apdu before forwarding this TC-END message through the SS7 network—step 370. This is because according to TCAP specifications, the dialog part is only present in the first messages exchanged. No dialogue control part APDUs are exchanged after that.

The presence of its own PC in the Calling Party address field of the TC-END message is used by SG 100 to distinguish a dialogue in which SG 100 does not participate, i.e. a dialogue initiated with the MAP operation inside the Begin Message, and a dialogue mediated by SG 100. As described in Q.714, even if a PC is present in the "called party address" parameter in a TC-BEGIN message received by an SG, it is not used by SCCP. Therefore, this field would normally be empty if the SG 100 is not mediating the transaction. Thus the presence of the PC of the SG100 in the calling party address field of the a TC-END message received from an AS (the calling party and called party fields having been exchanged by the TCP layer in AS 130) indicates that the SG 100 is mediating the transaction and therefore needs to carry out step 370.

If the Calling Party Address is routing on SSN, SG 100 includes—in step 370—the PC associated with the AS in place of the PC of SG 100 in the TC-END message before it is transmitted to MSC 200. If the Calling Party Address is routing on GT, the SG's PC is simply removed.

The approach is based on the following 3 assumptions:

1. The BEGIN message does not contain any component. It may contain an AARQ-apdu. In this case, the dialogue portion part contains the version and an application-context, but it is assumed not to contain any user information field. The user information field is field is not used in MAP, for instance.
2. All the Application Servers managed by the SG support a common set of versions and application-contexts. In other words, the AS's will not need to renegotiate the version or the application context.
3. The AS will always respond to the MAP operation by sending an TC-END message. In other words, the TC-CONTINUE message that contains the MAP operation will be the last message sent by MSC 200.

The inventors have found that the above assumptions are good for the majority of MAP operations and the majority of SG-AS configurations. The approach is thus well adapted for both White ITU-T networks as well as ANSI-96 networks.

Tables I and II illustrate an example of the messages that might be exchanged using the above scheme with the following parameters MSC 200 has PC=1; AS 100 has PC=10 and SSN=5 and SG 130 has PC=99. SG 100 includes a context table linking a set of IDs to application contexts, as follows:

TABLE I

| ID | Application Context Received | Application Context Response |
|----|------------------------------|------------------------------|
| 1  | shortMsgMO-RelayContext-v3   | shortMsgMO-RelayContext-v2   |
| 2  | shortMsgMO-RelayContext-v2   | shortMsgMO-RelayContext-v2   |
| 3  | shortMsgMO-RelayContext-v1   | shortMsgMO-RelayContext-v2   |
| 4  | shortMsgMT-RelayContext-v3   | shortMsgMT-RelayContext-v2   |
| 5  | shortMsgMT-RelayContext-v2   | shortMsgMT-RelayContext-v2   |

Table II shows the message flow, as described above.

In alternative embodiments, rather than an SUA layer on top of a SCTP layer, it is possible that the SUA layer may be combined with another communication layer, such as a TCP layer. Further, it will be understood that other embodiments may use other SIGTRAN adaptation layers such as M3UA, TUA and the like. Further, each application server discussed above could of course also be implemented by several application server processes using, for instance an interposed proxy load balancer, such as that described in U.S. published patent application 20040001517.

The foregoing discussion is premised upon one of ordinary skill in the art having a working understanding of the character and format of switching signals in the SS7 network, as well as the character and nature of converting SS7 signals for transport across IP networks. For additional information regarding SS7 network switching over IP networks, reference may be made to the (IETF) working drafts "Signalling Connecting Control Part User Adaptation Layer (SUA)" available from the IETF website at www.ietf.org, and IETF RFC 3332 "SS7 MTP3—User Adaptation Layer (M3UA)", available from the IETF website, and which is incorporated herein by reference as if reproduced in full. It is noted that each of these IETF documents is a work in progress and is therefore subject to change. However, these documents exemplify the changes necessary to a standard SS7 signalling system for its implementation in an IP network context. As well as defining the functions of signalling gateways and signalling gateway processes, the SIGTRAN documents referred to above specify in detail the protocols to be implemented between a signalling gateway and an application server.

More general background information regarding SIGTRAN protocols, reference may be made to the International Engineering Consortium, in document "SS7 Over IP Signalling Transport and SCTP," which is available from the IEC website www.iec.org, and which is incorporated herein by reference as if reproduced in full.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

TABLE II

| | Orig. | Dest. | Called Address | Calling Address | TCAP msg type | Orig. Tr. ID | Dest. Tr. ID | Application Context | Inv Operation |
|---|---|---|---|---|---|---|---|---|---|
| 1 | MSC | SG | SSN = 5 | PC = 1, SSN = 5 | BEGIN | 1 | | MsgMT-RC-v3 | |
| 2 | SG | MSC | SSN = 5 | PC = 10, SSN = 5 | CONTINUE | 5 | 1 | MsgMT-RC-v2 | |
| 3 | MSC | SG | SSN = 5 | PC = 1, SSN = 5 | CONTINUE | 1 | 5 | | ForwardSM |
| 4 | SG | AS | PC = 99, SSN = 5 | PC = 1, SSN = 5 | BEGIN | 1 | | MsgMT-RC-v2 | ForwardSM |
| 5 | AS | SG | PC = 1, SSN = 5 | PC = 99, SSN = 5 | END | | 1 | MsgMT-RC-v2 | RESULT |
| 6 | SG | MSC | SSN = 5 | PC = 10, SSN = 5 | END | | 1 | | RESULT |

The invention claimed is:

1. A method of operating a gateway to act as a conduit for a structured transaction between a first transaction peer and a second transaction peer, the structured transaction having at least a begin message for opening a logical communication path, a continue message for maintaining a logical communication path and an end message for closing a logical communication path, the method comprising:

receiving a first begin message from the first transaction peer, the first begin message including a context name;

receiving from the first transaction peer a continue message having a request element;

determining a routing key identifying the second transaction peer from the continue message;

constructing and sending a second begin message, including the continue message, to the second transaction peer, the second begin message constructed at least by extracting the parameter from the continue message, determining the context name using the parameter, and including the retrieved context name in the second begin message;

receiving a first end message including a response element from the second transaction peer;

constructing and sending a second end message including the response element to the first transaction peer; and responding to the first begin message with a return continue message that includes a parameter identifying the context name.

2. A method as claimed in claim 1 wherein the step of constructing the second begin message includes inserting a point code associated with the gateway in a calling party field and the step of constructing the second end message includes removing the point code from a called party field of the first end message.

3. A method as claimed in claim 1 wherein the gateway is a signalling gateway linking an SS7 network and an IP network.

4. A method as claimed in claim 1 wherein the structured transaction is a TCAP structured dialogue.

5. A method as claimed in claim 1 wherein the second transaction peer is an application server.

6. A method as claimed in claim 1 wherein the first transaction peer is a MAP user.

7. Apparatus for interconnecting at least a first signalling network with an application server via a second network, the apparatus being arranged to act as a conduit for a structured transaction between a first transaction peer on the first signalling network and a second transaction peer comprised in the application server, the structured transaction having at least a begin message for opening a logical communication path, a continue message for maintaining a logical communication path and an end message for closing a logical communication path, the apparatus being arranged to:

receive a first begin message from the first transaction peer, the first begin message including a context name;

receive from the first transaction peer a continue message having a request element;

determine a routing key identifying the second transaction peer from the continue message;

construct and send a second begin message, including the continue message, to the second transaction peer, the second begin message constructed at least by extracting the parameter from the continue message, determining the context name using the parameter, and including the retrieved context name in the second begin message;

receive a first end message including a response element from the second transaction peer;

construct and send a second end message including the response element to the first transaction peer; and respond to the first begin message with a return continue message that includes a parameter identifying the context name.

8. Apparatus as claimed in claim 7 wherein the step of constructing the second begin message includes inserting a point code associated with the gateway in a calling party field and the step of constructing the second end message includes removing the point code from a called party field.

9. A signalling gateway linking an SS7 network and an IP network comprising apparatus as claimed in claim 8.

10. A signalling gateway as claimed in claim 9 wherein the structured transaction is a TCAP structured dialogue.

11. A method of operating a switched circuit telephone network comprising:

arranging a gateway to act as a conduit for a structured transaction between a first transaction peer and a second transaction peer, the structured transaction having at least a begin message for opening a logical communication path, a continue message for maintaining a logical communication path and an end message for closing a logical communication path and in the gateway;

receiving a first begin message from the first transaction peer, the first begin message including a context name;

receiving from the first transaction peer a continue message having a request element;

determining a routing key identifying the second transaction peer from the continue message;

constructing and sending a second begin message, including the continue message, to the second transaction peer, the second begin message constructed at least by extracting the parameter from the continue message, determining the context name using the parameter, and including the retrieved context name in the second begin message;

receiving a first end message including a response element from the second transaction peer;

constructing and sending a second end message including the response element to the first transaction peer; and responding to the first begin message with a return continue message that includes a parameter identifying the context name.

12. A method of operating a signalling gateway linking an SS7 network and an IP network to act as a conduit for a TCAP structured dialogue between a first transaction peer and a second transaction peer, the TCAP structured dialogue having at least a begin message for opening a logical communication path, a continue message for maintaining a logical communication path and an end message for closing a logical communication path, the method comprising:
- receiving a first begin message from the first transaction peer, wherein the first begin message includes a context name;
- responding to the first begin message with a return continue message that includes a parameter identifying the context name;
- receiving from the first transaction peer a continue message having a request element;
- determining a routing key identifying the second transaction peer from the continue message;
- constructing and sending a second begin message, including the continue message, to the second transaction peer by at least extracting the parameter from the continue message, determining the context name using the parameter, including the retrieved context name in the second begin message, and inserting a point code associated with the gateway in a calling party field;
- receiving a first end message including a response element from the second transaction peer;
- constructing and sending a second end message including the response element to the first transaction peer including removing the point code from a called party field of the first end message; and
- responding to the first begin message with a return continue message that includes a parameter identifying the context name.

13. A method as claimed in claim 12 wherein the second transaction peer is an application server.

14. A method as claimed in claim 12 wherein the first transaction peer is a MAP user.

15. A signalling gateway for interconnecting at least a first SS7 network with an application server via an Internet Protocol network, the apparatus being arranged to act as a conduit for a TCAP structured dialogue between a first transaction peer on the first signalling network and a second transaction peer comprised in the application server, the TCAP structured dialogue having at least a begin message for opening a logical communication path, a continue message for maintaining a logical communication path and an end message for closing a logical communication path, the apparatus comprising:
- means for receiving a first begin message from the first transaction peer wherein the first begin message includes a context name;
- means for responding to the first begin message with a return continue message that includes a parameter identifying a context name;
- means for receiving from the first transaction peer a continue message having a request element;
- means for determining a routing key identifying the second transaction peer from the continue message;
- means for constructing and sending a second begin message, including the continue message, to the second transaction peer at least by extracting the parameter from the continue message, determining the context name using the parameter, including the retrieved context name in the second begin message and including inserting a point code associated with the gateway in a calling party field;
- means for receiving a first end message including a response element from the second transaction peer;
- means for constructing and sending a second end message including the response element to the first transaction peer including removing the point code from a called party field; and
- means for responding to the first begin message with a return continue message that includes a parameter identifying the context name.

16. A switched circuit telephone network comprising a signalling Gateway as claimed in claim 15.

* * * * *